Sept. 2, 1930.  C. H. CRONEY  1,774,637
SHORE PIPE NOZZLE
Filed March 7 1929
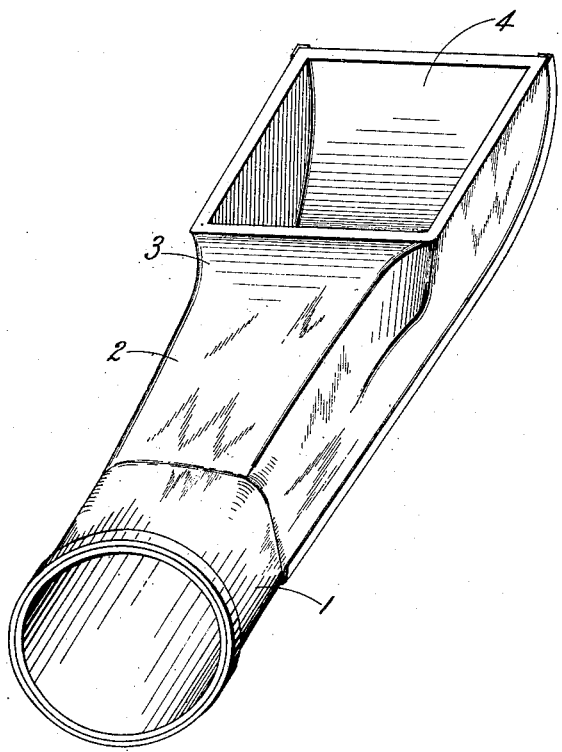
INVENTOR
CHARLES H. CRONEY
BY
ATTORNEY

UNITED STATES PATENT OFFICE

CHARLES H. CRONEY, OF BRUNSWICK, GEORGIA

SHORE-PIPE NOZZLE

Application filed March 7, 1929. Serial No. 345,071.

This invention relates to a fluid disposal system. More particularly it relates to a discharge conduit for hydraulic dredges and to the method of discharging material therefrom.

Hydraulic dredges are commonly used for removing the mud etc. from the bottoms of rivers, harbors, and the like in order to deepen the same. The dredges operate by stirring up and mixing the mud from the river bottom with water which is pumped up with the sediment in suspension thru a discharge conduit or shore pipe. The sediment withdrawn from the river bottom can be used for filling up low places along the shore and the discharge conduit leads to and terminates at such a suitable place of disposal. In hydraulic dredges customarily used the mixture of liquid and sediment is forced through the conduit with considerable velocity which aids in maintaining the sediment in suspension in the liquid and with the cylindrical shore pipes the mixture of liquid and sediment is discharged from the conduit at a high rate of velocity. As a consequence the falling liquid washes a hole in the earth and fills up the sides of the hole with a crater-like mound of deposited sediment which settles from the liquid upon reduction in its velocity of flow. Under such conditions the surface of the ground becomes so uneven that it must subsequently be graded.

It is an object of this invention to construct an unobstructed shore pipe through which the mixture of liquid and solids will flow and will issue with reduced velocity.

Another object is to construct an unobstructed shore pipe which will operate to spread the stream of mixed liquids and solids issuing therefrom.

A further object is to provide an improved method of discharging material from a shore pipe.

Other objects will be apparent from the specification and from the accompanying drawings in which latter—

The figure is a perspective view of a shore pipe.

Referring particularly to the drawings, in its preferred embodiment, the device comprises a shore pipe nozzle which is adapted to be secured in any suitable manner, as by welding, upon the end of a shore pipe (not shown) which leads from the suction dredge. The base 1 of the shore pipe nozzle is cylindrical in shape conforming to the shape of the shore pipe to facilitate securing the same thereto. From the base 1 the walls 2 of the shore pipe nozzle are tapered slightly outwardly throughout a portion of their extent and are then flared outwardly at 3 to form the inner wall of the discharge opening of the shore pipe nozzle. The outer wall 4 of the shore pipe nozzle curves inwardly laterally opposite the outwardly flaring wall 3. This wall flares outwardly with respect to the wall 3 forming a rapidly enlarging opening with respect thereto and terminates preferably in a plane which extends parallel with the axis of the shore pipe nozzle. The discharge mouth formed by the outwardly flaring walls is rectangular in cross section and of a generally frusto-pyramidal shape.

In utilizing the device the shore pipe leading from the hydraulic dredge is positioned so that it will terminate at the locality which is to be filled with sediment from the river bottom. The short pipe nozzle is affixed thereto with its discharge opening facing upward in spaced relation to the ground. Upon operation of the hydraulic dredge a mixture of liquid and sediment is forced through the discharge conduit into the shore pipe nozzle. As the mixture passes through the passage bounded by the outwardly flaring walls of the nozzle its cross sectional area becomes substantially enlarged in proportion to the cross section of the conduit with the result that its velocity becomes substantially reduced as it passes from the discharge mouth and falls to the ground. The liquid becomes spread over the area of the mouth of the nozzle and in falling strikes an enlarged area of ground. Due to the enlarged cross section of liquid and to the low rate of travel of the liquid the latter effects a minimum of erosion of the ground and permits of the deposition of the sediment evenly and uniformly thereon. The passageway of the shore pipe nozzle is unobstructed throughout its extent and the beneficial results obtained are obtained by the construction of the wall of the shore pipe nozzle.

While a preferred embodiment of the invention has been shown and described it will be understood that various modifications can be made therein within the scope of the appended claims.

What is claimed is:

1. A shore pipe nozzle comprising a conduit portion and an upwardly opening and outwardly flared mouth portion.

2. A shore pipe nozzle comprising a conduit portion and an upwardly opening and outwardly flared mouth portion which is free from obstructions upon the inner surface thereof.

3. A shore pipe nozzle comprising a conduit portion and an upwardly opening and outwardly flared mouth portion of frusto-pyramidal shape which is free from obstructions upon the inner surface thereof.

4. A shore pipe nozzle comprising a conduit portion having one end adapted to be secured to a shore pipe and an upwardly opening and outwardly flared mouth portion disposed at the other end of said conduit portion.

5. A shore pipe nozzle comprising a conduit portion having one end adapted to be secured to a shore pipe and its opposite end formed into an upwardly opening and outwardly flared mouth portion, said mouth portion having smooth inside walls.

6. A shore pipe nozzle comprising a conduit portion having one end adapted to be secured to a shore pipe and its opposite end formed with a frusto-pyramidal, upwardly opening mouth portion.

7. A shore pipe nozzle comprising a conduit portion having one end adapted to be secured to a shore pipe and its opposite end formed into a frusto-pyramidal, upwardly opening mouth portion, said mouth portion having smooth inside walls.

In testimony whereof I hereunto affix my signature this 22nd day of February, 1929.

CHARLES H. CRONEY.